US006795759B2

(12) United States Patent
Doyle

(10) Patent No.: US 6,795,759 B2
(45) Date of Patent: Sep. 21, 2004

(54) SECURE LOGGING OF VEHICLE DATA

(75) Inventor: Ronald P. Doyle, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/227,776

(22) Filed: Aug. 26, 2002

(65) Prior Publication Data

US 2004/0039503 A1 Feb. 26, 2004

(51) Int. Cl.[7] .................................................. G06F 7/00

(52) U.S. Cl. ......................... 701/35; 340/438; 340/459; 340/426; 342/457; 348/148

(58) Field of Search ............................. 701/28, 29, 35, 701/45, 213, 33, 34, 63, 66; 340/438, 439, 937, 459, 426, 541, 52 H, 901, 436, 539, 904; 342/357, 352, 457; 348/148

(56) References Cited

U.S. PATENT DOCUMENTS

| | | | | | |
|---|---|---|---|---|---|
| 3,781,824 | A | | 12/1973 | Caiati et al. | 340/172.5 |
| 3,870,894 | A | | 3/1975 | Brede et al. | 307/9 |
| 4,258,421 | A | | 3/1981 | Juhasz et al. | 364/424 |
| 4,387,587 | A | | 6/1983 | Faulconer | 73/9 |
| 4,533,962 | A | | 8/1985 | Decker et al. | 360/5 |
| 4,638,289 | A | * | 1/1987 | Zottnik | 246/45 |
| 4,836,024 | A | | 6/1989 | Woehrl et al. | 73/514 |
| 4,944,401 | A | | 7/1990 | Groenewegen | 206/521 |
| 5,412,570 | A | | 5/1995 | Gruler et al. | 364/424.04 |
| 5,446,659 | A | * | 8/1995 | Yamawaki | 701/29 |
| 5,471,193 | A | | 11/1995 | Peterson et al. | 340/438 |
| 5,581,464 | A | | 12/1996 | Woll et al. | 364/424.04 |
| 5,608,629 | A | | 3/1997 | Cuddihy et al. | 364/423.098 |
| 5,790,427 | A | | 8/1998 | Greer et al. | 364/556 |
| 5,815,093 | A | | 9/1998 | Kikinis | 340/937 |
| 5,877,707 | A | | 3/1999 | Kowalick | 340/988 |
| 6,067,488 | A | | 5/2000 | Tano | 701/35 |
| 6,076,026 | A | | 6/2000 | Jambhekar et al. | 701/35 |
| 6,141,611 | A | | 10/2000 | Mackey et al. | 701/35 |

(List continued on next page.)

FOREIGN PATENT DOCUMENTS

| | | | | | |
|---|---|---|---|---|---|
| EP | 629978 | A1 | * | 12/1994 | G07C/5/08 |
| JP | 06044430 | A | * | 2/1994 | G07C/5/00 |
| WO | WO 88/09023 | | | 11/1988 | G07C/5/08 |
| WO | WO 94/04975 | | | 3/1994 | G06F/13/00 |
| WO | WO 94/18645 | | | 8/1994 | G07C/5/08 |
| WO | WO 98/47109 | | | 10/1998 | G07C/5/08 |
| WO | WO 00/17721 | | | 3/2000 | G05B/23/02 |
| WO | WO 01/18491 | | | 3/2001 | G01C/22/00 |

OTHER PUBLICATIONS

J. Mackey, et al., *Digital Eye–Witness Systems, Loss Management Services, Inc.,* International Symposium on Transportation Recorders (May 3–5, 1999).

N. Martin, *Big Brother is Watching!, Cahners Publishing Co.,* (Oct. 1999).

(List continued on next page.)

*Primary Examiner*—Thomas G. Black
*Assistant Examiner*—Tuan C To
(74) *Attorney, Agent, or Firm*—Jerry W. Herndon, Esq.; Steven M. Greenberg, Esq.; Christopher & Weisberg, P.A.

(57) ABSTRACT

A secure event data recording system configured for use in a passenger vehicle. The secure event data recording system can include an event data recorder; a memory device coupled to the event data recorder and configured to store event data processed in the event data recorder; and, an input/output port communicatively linked to the memory device through which read/write access can be provided to the memory device. Significantly, a tamper proof sealing mechanism can be provided which bars access to the memory device, the event data recorder and the input/output port without causing an irreparable breach of the tamper proof sealing mechanism.

2 Claims, 3 Drawing Sheets

U.S. PATENT DOCUMENTS

| | | | | | |
|---|---|---|---|---|---|
| 6,185,490 | B1 | | 2/2001 | Ferguson | 701/35 |
| 6,246,933 | B1 | * | 6/2001 | Bague | 701/35 |
| 6,246,934 | B1 | | 6/2001 | Otake et al. | 701/35 |
| 6,266,588 | B1 | * | 7/2001 | McClellan et al. | 701/35 |
| 6,298,290 | B1 | | 10/2001 | Abe et al. | 701/35 |
| 2002/0072838 | A1 | * | 6/2002 | McClellan et al. | 701/35 |
| 2002/0075167 | A1 | * | 6/2002 | Chainer et al. | 340/901 |
| 2002/0101509 | A1 | * | 8/2002 | Slomski | 348/143 |
| 2002/0105438 | A1 | * | 8/2002 | Forbes et al. | 340/901 |
| 2003/0135311 | A1 | * | 7/2003 | Levine | 701/35 |
| 2003/0212488 | A1 | * | 11/2003 | Oexmann et al. | 701/213 |

OTHER PUBLICATIONS

K. Kowalenko, *IEEE To Create Standards for Vehicle 'Black Box' Devices, The Institute,* vol. 26, No. 6 (Jun. 2002).

*Event Data Recorder Applications for Highway and Traffic Safety,* NHTSA, <http://www–nrd.nhtsa.dot.gov/edr–site/>, (visited Aug. 18, 2002).

* cited by examiner

SECURE LOGGING OF VEHICLE DATA

BACKGROUND OF THE INVENTION

1. Statement of the Technical Field

The present invention relates to the field of event data recorders, and more particularly to the secure logging of vehicle data in a tamper-proof event data recorder.

2. Description of the Related Art

Event data recorders have always been an important component of transportation safety. Most notably, event data recorders, referred to among the general lay public as "black boxes", have performed admirably in the context of aviation flight safety. In that regard, black box technology has proven to be a critical component in reconstructing the events leading to an aviation accident. In consequence of the use of black box technology, the root cause of airplane disasters have been determined and important changes have resulted in the aviation industry.

Event data recorders have performed similarly in the context of automotive safety. Specifically, in 1974, the United States National Highway Traffic Safety Administration (NHTSA) equipped over one-thousand automobiles with analog event data recorders in an effort store crash data for future analysis. Since 1974, both the United States National Transportation and Safety Board (NTSB) and the Office of Technology Assessment have studied the widespread use and resulting advantages of event data recorders in passenger vehicles. The keen interest in event data recorders exhibited by government bureaucrats no doubt has encouraged private research and development in the field which has resulted in more than a few domestic and foreign patents which relate to capturing of vehicular event data.

For example, U. S. Pat. No. 6,246,934 to Otake et al. for VEHICULAR DATA RECORDING APPARATUS AND METHOD relates to the recording of running data regarding a vehicle into a memory in an overwrite manner when the running data needs to be recorded. If the vehicle enters an abnormal state, such as a crash or the like, the apparatus prevents the recording, and retains the running data recorded up to that moment in the memory. The data can be retrieved for subsequent analysis simply by accessing the memory subsequent to the crash.

Similarly, U. S. Pat. No. 6,067,488 to Tano for VEHICLE DRIVING RECORDER, VEHICLE TRAVEL ANALYZER AND STORAGE MEDIUM teaches the sequential measurement and storage in memory of angular velocity data and acceleration data of a vehicle, along with time information. If a shock due to a crash occurs at the vehicle, a given time period is set for further data storage. When the time period expires, the data storage into the memory is stopped. Thus, the memory holds at least the angular velocity data and the acceleration data for the set time period after the detection of the occurrence of a shock and for a given time period before detection of the occurrence of the shock. Once again, the crash data can be accessed directly through a communication port.

In recent years, the perceived importance of event data recording has risen dramatically in concert with an equally significant rise in insurance claims and civil litigation relating to vehicular accidents. In the past five years alone, the NTSB has promulgated rules which require the use of event data recorders at least on the bus and truck industry. Though the NTSB has yet to mandate the use of equivalent devices in all passenger vehicles, public pressure is mounting for just such a requirement. Still, many in the public fear the privacy implications of mandated "black box" technology. Notwithstanding, to satisfy evidentiary requirements set forth according to the legal system, the contents of an event data recorder must be verifiably secure so as to constitute evidence of the state of a vehicle before, during and after a car accident.

Though most issued patents teach an unsecured mode of accessing event data in a vehicularly mounted event data recorder, some of the technology described among a handful of issued patents suggest some tamper-proofing. For instance, U. S. Pat. No. 5,471,193 to Peterson et al. for TAMPER-RESISTANT VEHICLE EVENT RECORDER relates to a tamper-resistant vehicle event recorder having a combustible film on a polymeric substrate. Responsive to a vehicular event, an ignition mechanism can ignite the combustible film so as to prevent the re-recording of data on the film. As a result, an imprint of the accident data can be preserved on the film.

Several private initiatives also have considered the problem of securing event data gathered by an event data recorder during the course of a vehicular event. One such private initiative, Independent Witness, Inc. of Salt Lake City, Utah, United States, provides a solution consisting of two principal components: a black box configured to record the date, time, direction, impact severity and acceleration profile responsive to a car accident; and, an accident severity and injury potential database which can store the data recorded by the black box to a database and can be compared against the accident data of other accidents. By collecting accident data across multiple accidents, the force of an accident can be directly correlated to "injury potential". Nevertheless, the solution proposed by IWI does not provide for a secure chain of custody of accident data from accident to database. Specifically, nothing prevents a third party from tampering with the accident data prior to the downloading of the accident data from the black box to the database.

SUMMARY OF THE INVENTION

The present invention is a secure event data recording system configured for use in a passenger vehicle. The secure event data recording system can include an event data recorder; a memory device coupled to the event data recorder and configured to store event data processed in the event data recorder; and, an input/output port communicatively linked to the memory device through which read/write access can be provided to the memory device. Significantly, a tamper proof sealing mechanism can be provided which bars access to the memory device, the event data recorder and the input/output port without causing an irreparable breach of the tamper proof sealing mechanism.

The system also can include a vehicle interface disposed between the event data recorder and the vehicle. In particular, the vehicle interface can provide access to sensing devices in the vehicle. The system also can include a read only output communicatively linked to the memory device through which read only access can be provided to the memory device without causing an irreparable breach of the tamper proof sealing mechanism. In this way, event data can be accessed in those circumstances where the integrity of the event data need not be certified.

A method of providing certified vehicle event data in response to the occurrence of a vehicle event can include installing an event data recorder in a vehicle belonging to a vehicle owner/operator and applying a tamper proof sealing mechanism to the event data recorder. A report of a vehicle event involving said vehicle can be retrieved. Subsequently, the event data recorder can be accessed in the vehicle and it can be determined whether the tamper proof sealing mechanism has been breached. If the tamper proof sealing mechanism has not been breach, event data can be extracted from the event data recorder and the integrity of the extracted event data can be certified to an evaluating authority.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a secure event data recorder for use in passenger vehicles such as automobiles, personal watercraft and the like. In accordance with the inventive arrangements, an event data recorder can be coupled to a passenger vehicle and can be configured to record vehicle performance data such as speed, acceleration, impact force, date, time, etc. Upon installation, the event data recorder can be sealed using a tamper proof sealing mechanism, such as a mechanical seal, a chemical seal, or an electronic seal. The installation of the event data recorder itself can be recorded by way of video and attested to under oath by an independent agency.

Upon the occurrence of a vehicular event, the extraction of the recorded event data in the event data recorder can be performed only by the independent agency or an affiliate thereof so that the integrity of the contents of the event data recorder can be attested thereto. For instance, the state of the tamper proof sealing mechanism subsequent to a vehicular event can be compared to the state of the tamper proof sealing mechanism at the time of installation. In that regard, the recorded video, or other recorded record can be helpful in ascertaining whether any attempt has been made to circumvent the security of the event data recorder.

To the extent that it can be determined that the event data recorder had not been accessed by anyone in the period of time between installation of the event data recorder and the removal of the event data recorder, the independent agency can certify the integrity of the contents of the event data recorder. Furthermore, the contents of the event data recorder can be extracted by the independent agency and the contents, too, can be certified as a true and correct record of the vehicular event. In this way, unlike prior art event data recorders, the contents of the event data recorder can be assured to have not been tampered with by any unauthorized party. As a result, the secure event data recorder of the present invention can facilitate the resolution of accident claims and can reduce the volume of unnecessary litigation arising from unclear accounts of a traffic accident.

Figure 1:
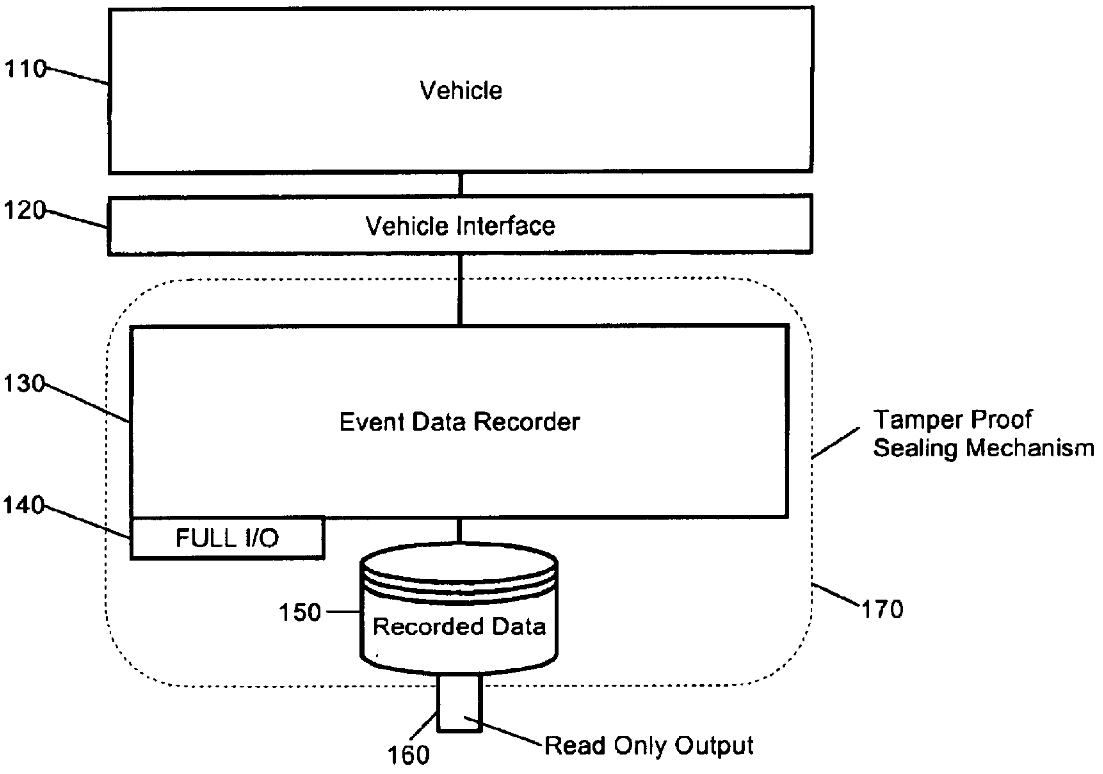
FIG. 1 is a schematic diagram illustrating an event data recorder coupled to a passenger vehicle which has been configured in accordance with the inventive arrangements.

FIG. 1 is a schematic diagram illustrating an event data recorder coupled to a passenger vehicle which has been configured in accordance with the inventive arrangements. Specifically, the event data recorder 130 can be coupled to a vehicle 110 through a vehicle interface 120. The vehicle 110 can be any passenger vehicle or its equivalent, such as an automobile, motor-propelled cycle craft, personal water craft, human-powered cycle craft and the like. The vehicle interface 120 can provide external access to transducive elements pre-existing within the vehicle 110 such as a speed monitoring device, and variously positioned accelerometers.

The event data recorder 130 can be a conventional event data recorder such as those configured to record data both sensed externally within the vehicle 110 through the vehicle interface, and also data sensed internally using sensors and data gathering components provided by the event data recorder 130. Such sensors can include, but are not limited to, velocimeters, accelerometers, impact sensors, time and date measurements, gyroscopic data, directional sensors, temperature and humidity gauges, and the like. In any case, the event data recorder 130 of the present invention can record vehicular event data to memory device 150, either in an overwrite mode, or non-overwrite mode. In that regard, the memory device 150 can be a static, solid state memory device such as Compact Flash memory, or Smart Digital memory, or disk media, such as an optical or hard disk drive.

Importantly, the event data recorder 130, and more particularly, the memory device 150 can be rendered tamper proof using a tamper proof seal mechanism 170. The tamper proof seal mechanism 170 can be a mechanical, electrical or chemical seal such as an encasement having a tab for a seal, which when the encasement is open, will be irreparably broken. Alternatively, an electromechanical assembly can sense the breaching of encasement and can record the breach. Finally, a chemical reaction between one or more materials can be induced through the breach of the encasement producing an observable change in an indicator material. In any event, it is to be understood that the invention is not limited to the precise manner in detecting an unauthorized breach of the event data recorder 130 and any tamper proof seal or equivalent can suffice.

Notably, the event data recorder 130 can include an input/output (I/O) port 140 through which event data recorded in the memory device 150 can be retrieved and manipulated in place. To access the I/O port 140, however, a breach of the tamper proof seal mechanism 170 will be required. Nevertheless, in one aspect of the invention, a read-only output port 160 can be provided through which the event data stored in the memory device 150 can be read out without requiring a breach of the tamper proof sealing mechanism, though the data itself cannot be manipulated in place within the memory device 150.

Figure 2:
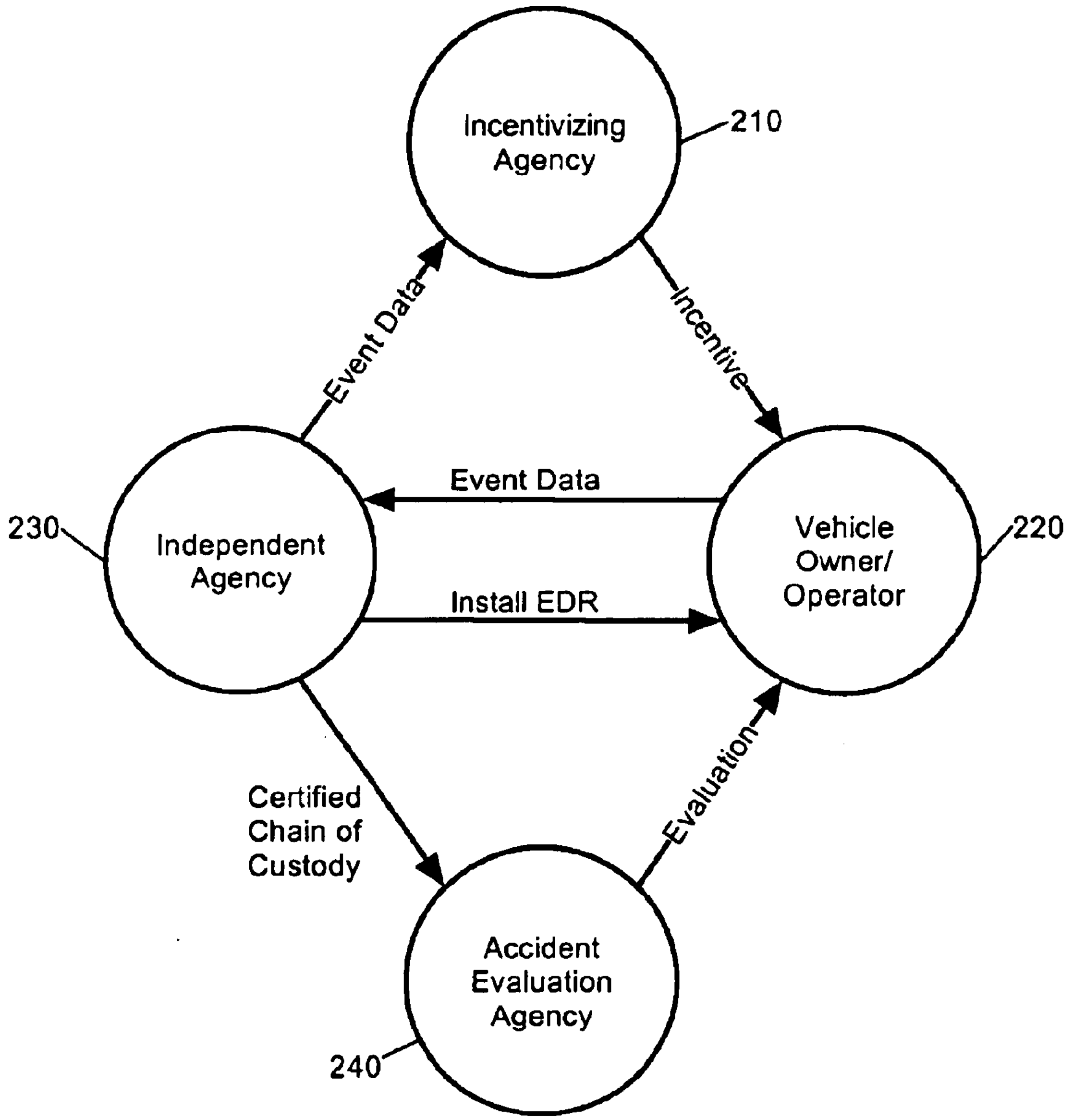
FIG. 2 is a block diagram illustrating an exemplary application of the event data recorder of the FIG. 1; and, FIG. 3 is a timing chart illustrating a process for securely recording event data using the event data recorder of the FIG. 1 in accordance with the exemplary application of FIG. 2.

As will be apparent to one skilled in the art, the unique combination of an event data recorder protected by a tamper proof sealing mechanism can provided for substantial advantages in operation across multiple applications. FIG. 2 is a block diagram illustrating one such exemplary application of the event data recorder of the FIG. 1. In accordance with the exemplary application shown in FIG. 2, an incentivizing agency such as an insurance agency 210 can provide an incentive for an insured customer, such as a vehicle owner/operator 220 to install the secure event data recorder of FIG. 1. The incentive can include a monetary incentive, for example, a reduction in the insurance premium, or a reduced deductible.

An independent agency 230, known hereinafter as a "certifying authority", can install the secure event data recorder in the vehicle of the vehicle owner/operator 220. At the time of installation, the certifying authority 230 can ensure the proper operation of the event data recorder as installed before activating the tamper proof sealing mechanism. Optionally, the certifying authority can record the installation process on videotape to provide ample documentary evidence of the installation and the state of the event data recorder at the time of installation. In any event, the certifying authority can provide a sworn oath by the installer or installers testifying to the integrity of the installed event data recorder.

Upon the occurrence of a vehicle event such as an traffic accident, the vehicle owner/operator 220 can provide either the vehicle with the event data recorder, or the event data recorder alone, in both cases with the tamper proof sealing mechanism in tact and unbreached, to the certifying authority 230. The certifying authority 230 first can inspect the tamper proof sealing mechanism to ensure that the event data recorder has not been breached since the time of installation. To assist in this evaluation, both a visual and electronic inspection can be conducted, using the documentary evidence as needed. If it is clear that the tamper proof sealing mechanism has not been breached, the certifying authority 230 can breach the tamper proof sealing mechanism and can extract the event data stored in the memory device through the I/O port. Subsequently, the certifying authority 230 can provide the extracted data to the accident evaluation agency 240—for example a court of law or a law enforcement agency—and can attest under oath as to the integrity of the data.

Figure 3:
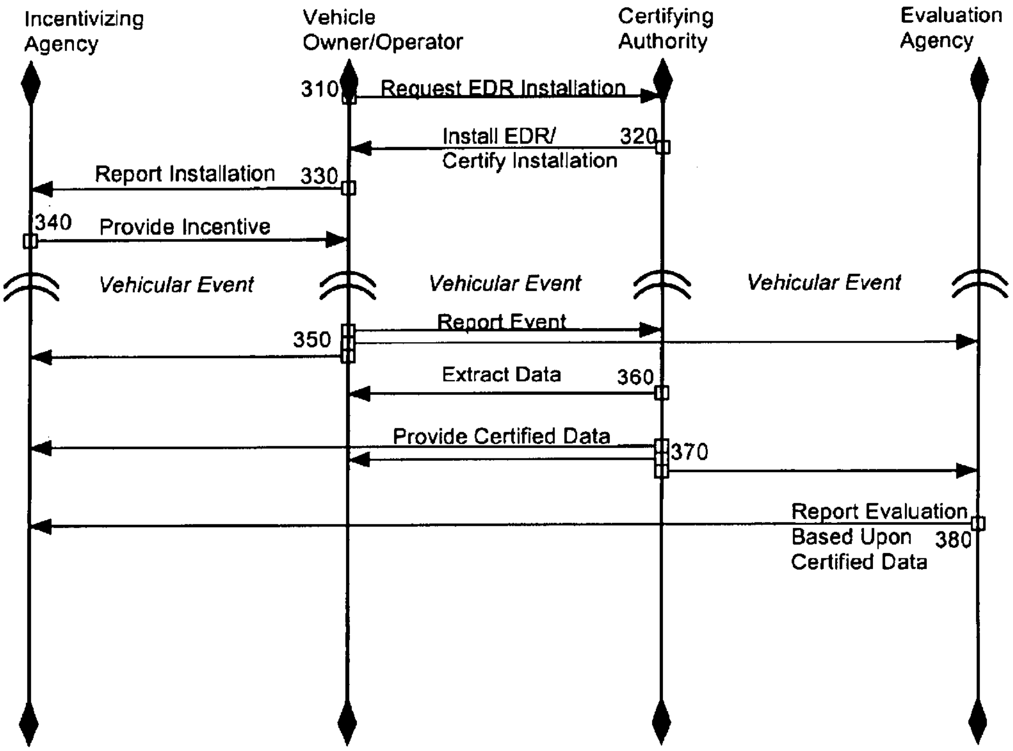

FIG. 3 is a timing chart illustrating a process for securely recording event data using the event data recorder of the FIG. 1 in accordance with the exemplary application of FIG. 2. Beginning in step 310, the vehicle owner/operator can request an event data recorder installation from the certifying authority. In step 320, the certifying authority can install the event data recorder in the vehicle belonging to the vehicle owner/operator. Additionally, the certifying authority can certify the integrity of the installation, by way, for instance of a video recording and sworn statement. Once the event data recorder has been installed, the vehicle owner operator in step 330 can report the installation to the incentivizing agency, for instance an auto insurance company providing coverage for the vehicle. In step 340, the incentivizing agency, in turn, can provide an incentive to the vehicle owner/operator.

Subsequent to the installation of the event data recorder, the vehicle owner/operator can operate the vehicle as normal until the occurrence of an event, such as a traffic accident or a traffic violation. At the moment of the vehicular event, the event data recorder can record vehicular data as would be the case with any conventional event data recorder. Yet, to capitalize upon the security of the event data recorder, the vehicle owner/operator need not access the event data recorder directly—though the vehicle owner/operator can read out the data through the read-only port. Rather, in step 350 the vehicle owner/operator need only report the occurrence of the event to the certifying authority, and optionally the incentivizing agency and an evaluation agency such as a law enforcement agency or a claims adjustor.

Still, it will be recognized by one skilled in the art that it may be preferable to at least read out the data from the event data recorder without first breaching the tamper proof sealing mechanism. Such an occasion might arise, for instance, where the vehicle owner/operator has been stopped by a traffic police officer and accused of speeding. Using the impartial data collected from the read-only port of the event data recorder, the vehicle owner/operator could conceivable demonstrate to the traffic police officer that a speeding infraction had not, in fact, occurred without first requiring the intervention of the certifying authority. In any event, to provide verifiable evidence of the vehicle state at the time of a vehicle event, access to the underlying memory device via the tamper proof sealing mechanism will be required.

In that case, in step 360, the certifying authority can breach the tamper proof sealing mechanism of the event data recorder and can access the event data stored therein. More importantly, the certifying authority can ascertain the condition of the event data recorder and can determine whether the tamper proof sealing mechanism has been breached, or whether the integrity of the event data recorder has remained intact. If it can be determined that the tamper proof sealing mechanism has not been breached, the certifying authority in step 370 can so certify to the incentivizing agency, the vehicle owner/operator and the evaluation agency, along with providing the event data itself. Based upon the certified event data, the evaluation agency, for instance an insurance claim adjuster or a court of law, can determine the cause of the vehicle event based upon the certified event data.

I claim:

1. A method of providing certified vehicle event data in response to the occurrence of a vehicle event, the method comprising the steps of:

installing an event data recorder in a vehicle belonging to a vehicle owner/operator and applying a tamper proof sealing mechanism to said event data recorder;

receiving a report of a vehicle event involving said vehicle;

accessing said event data recorder in said vehicle and determining whether said tamper proof sealing mechanism has been breached;

if said tamper proof sealing mechanism has not been breach, extracting event data from said event data recorder and certifying the integrity of said extracted event data to an evaluating authority; and, providing a sworn certification of the integrity of said event data recorder at the time of installation.

2. A method of incentivizing the installation and use of a secure event data recorder, the method comprising the steps of:

receiving notice of a customer's installation of an event data recorder which has been secured by a tamper proof sealing mechanism; and, providing a financial incentive to said customer based upon said installation.

* * * * *